United States Patent Office 3,697,382
Patented Oct. 10, 1972

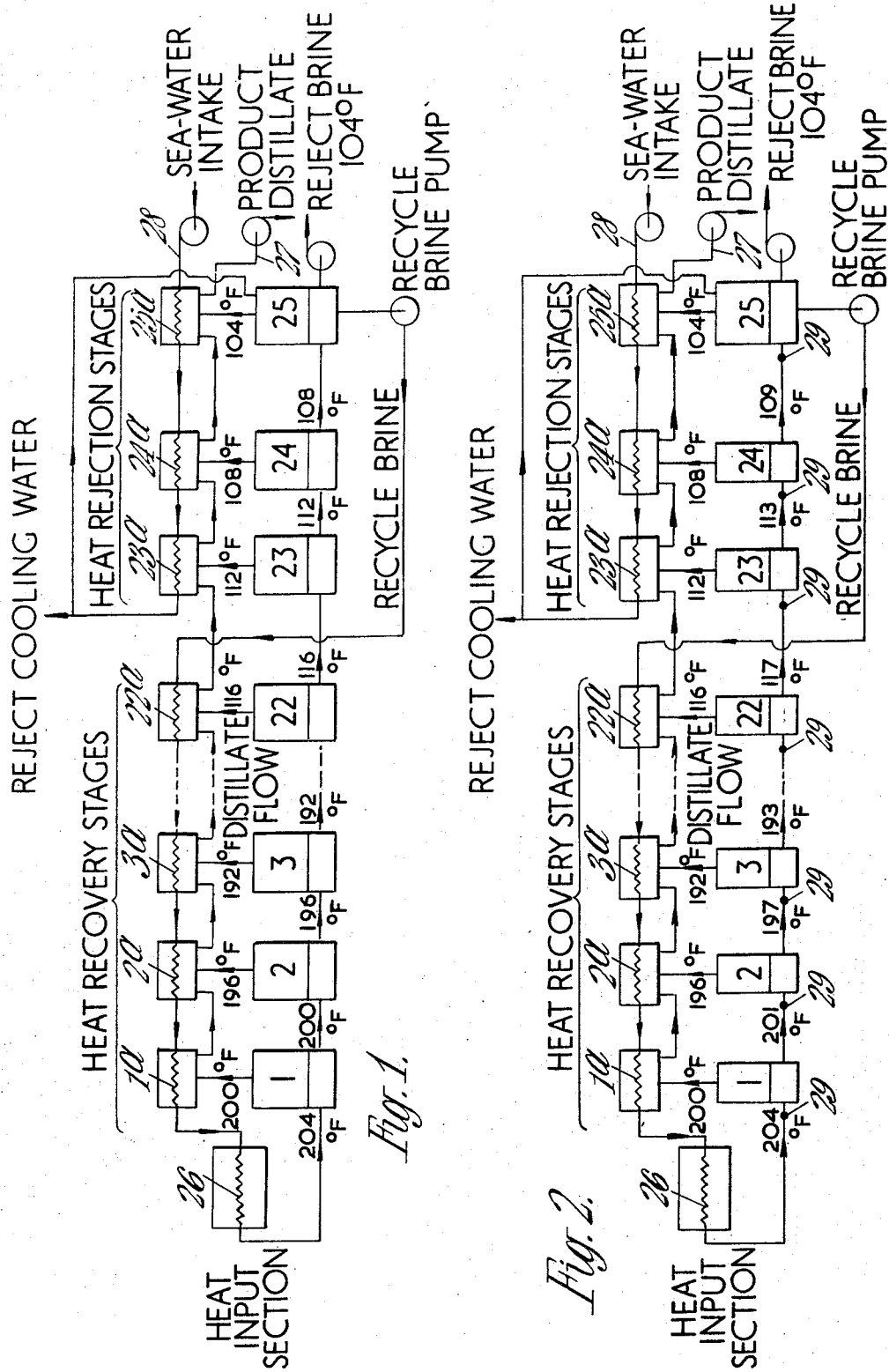

3,697,382
METHOD OF AND APPARATUS FOR THE MULTI-FLASH DISTILLATION OF LIQUIDS
Andrew Porteous, Bearsden, Dunbartonshire, Scotland, assignor to National Research Development Corporation
Filed Nov. 17, 1969, Ser. No. 877,145
Claims priority, application Great Britain, Nov. 19, 1968, 5,483/68
Int. Cl. B01d 3/10, 3/06, 3/02
U.S. Cl. 202—173
2 Claims

ABSTRACT OF THE DISCLOSURE

The invention relates to the multi-flash distillation of liquids wherein distillation is effected by a plant comprising a series of distillation stages each having a heat exchanger and associated flash chamber, a heater introduced between the final heat exchanger and the first flash chamber, the heater and flash chambers being all connected in series and means by which the pressure is reduced in successive chambers.

---

According to the invention the residence time of the liquid passing through at least two of the flash chambers is so controlled that not more than 97% equilibration is obtained therein and in the preceding chamber the percentage of equilibration is marginally less to initiate the operating percentage of equilibration in the said succeeding chambers thus ensuring an increase in the temperature difference between the liquid and the flashed vapour in the said chambers.

The invention also consists in the plant wherein the said residence time is controlled by reducing the size of the flash chambers.

This invention has reference to the multi-flash distillation of liquids.

A multi-flash distillation plant comprises essentially a series of distillation stages each having a heat exchanger and an associated flash chamber, a heater introduced between the final heat exchanger and the first flash chamber, the heat exchangers, the heater and the flash chambers being all connected in series in the order given, and means by which progressively lower pressure is maintained in successive flash chambers.

In distillation by such plant the temperature of the liquid is raised in passing through the successive heat exchangers by the vapours of their associated flash chambers, the temperature of the liquid is further raised by the heater and the liquid then passed through the successive flash chambers in each of which a fraction of the liquid is flashed, the vapour being condensed by the respective heat exchangers.

The flashing of the liquid in each chamber is due to the saturation temperature of the vapour therein being below the temperature of the inflowing liquid.

Heretofore multi-flash distillation plants have been so designed and operated that the residence time of the liquid in passing through each flash chamber is such that it flashes to obtain equilibrium of temperature with that of the vapours therein and leaves at the saturation temperature of the respective chambers. Should the liquid be a solution such temperature is increased by the boiling point elevation of the solution.

Percentage of equilibration is expressed by the formula:

$$\frac{T_{Bi} - T_{Bo}}{T_{Bi} - (t_s + t_e)} \times 100$$

where $T_{Bi}$ is the liquid inlet temperature to a stage
$T_{Bo}$ is the liquid outlet temperature from the same stage
$t_s$ is the vapour saturation temperature corresponding to vapour pressure in the stage
$t_e$ is the boiling point elevation if the liquid is a solution.

In prior art practice the equilibration attained is greater than 99% in each stage.

The object of the present invention is primarily to provide an improved method of flash distillation whereby for the same output as is obtained by the flash distillation plants as heretofore constructed the size of the plant is substantially reduced.

Another object of the invention is to provide a flash distillation plant which will be substantially smaller than such plants of known construction which have the same output and performance ratio which latter is defined as the pounds of distillate produced per 1,000 B.t.u. of heat input.

According to the present invention in the distillation of liquids by the flash method carried out in at least four chambers in series the residence time of the liquid in passing through each of at least two of the flash chambers connected in series is so controlled that not more than 97% equilibration as above defined is obtained in said two chambers and in the preceding chamber the percentage of equilibration is marginally less than the percentage of equilibration in the following two or more chambers to initiate the operating percentage of equilibration in the said succeeding chambers thus ensuring an increase in the temperature difference between the liquid and the flashed vapour in the said chambers and the liquid leaving said chambers.

In preference the residence time in all but the last flashing chamber is so controlled.

The invention further consists in a multi-flash distillation plant as herein defined for carrying out the method of distillation set forth in either of the preceding paragraphs wherein the residence time in at least three flash chambers is obtained by reducing the dimensions of such chambers in comparison with a plant having the same number of stages and designed to operate at 100% equilibration to produce the same stage distillate output.

The invention will be better understood by describing both the method and the apparatus with reference to the accompanying drawings wherein:

FIG. 1 shows diagrammatically an example of a multi-flash distillation plant of known construction; and FIG. 2 shows diagrammatically a plant in accordance with the present invention and designed to give the same output for the liquid flow rate as in the plant shown in FIG. 1.

Both plants have twenty-five stages, only the flash chambers designated 1, 2, 3, 22, 23, 24 and 25 and their associated heat exchangers 1a, 2a, 3a, 22a, 23a, 24a and 25a are shown. The heater is designated 26 and is introduced between the end heat exchanger 1a and the first flash chamber 1.

The heat exchangers 25a, 24a, 23a, 22a to 3a, 2a, 1a, the heater 26 and the flash chambers 1, 2, 3 to 22, 23, 24 and 25 are all connected in series. The flows of liquid being distilled, the distillate and vapours are indicated by the arrows.

The distillate obtained by condensation of the flashed liquid by the heat exchangers flows counter to the flow of the liquid through the heat exchangers and is discharged at 27 and the liquid to be distilled is introduced through the intake 28 to the first heat exchanger 25a.

The pressures in the flash chambers are successively decreased from the first to the last chamber in known manner.

It will be assumed that the liquid being distilled is sea-water-brine.

Sea-water-brine passes through the heat exchangers from heat exchanger 25a to heat exchanger 24a and during its passage its temperature is raised by condensation of the vapour from the chamber 25. The vapour saturation temperatures are shown below the heat exchangers.

In like manner the sea-water-brine passes through the heat exchangers of the succeeding stages and is heated by the vapours from the respective associated flashing chambers. The pre-heated sea-water-brine now passes through the heater 26 to further raise the temperature thereof finally to 204° F. The operation of both plants up to this point is similar.

Reference will now be directed to the operation of the plant shown in FIG. 1.

The sea-water-brine now pre-heated to 204° F. enters flash chamber 1 wherein part of the liquid is flashed, the vapour at 200° F. saturation temperature passing to the heat exchanger 1a the sea-water-brine now at 200° F. passes to flash chamber 2. In this chamber part of the liquid is flashed, the vapour at 196° F. saturation temperature passing to heat the heat exchanger 2a and the sea-water-brine now at 196° F. passing to the next flash chamber.

In like manner the liquid is flashed at each stage, the temperature dropping 4° F. at each stage, and a fraction of the liquid is flashed to vapour and is condensed by the respective heat exchanger. In each flash chamber the residence time is such that the percentage equilibration is greater than 99%. That is the liquid reaches virtually the saturation temperature at the pressure existing in the respective chambers.

Reference will now be made to FIG. 2.

The sea-water-brine entering chamber 1 has a shortened residence time so that it is flashed and passed to chamber 2 at 201° F. The residence time in the first stage is such that it initiates the departure from equilibrium which is subsequently made use of up to stage 25. That is, the residence time in stage 1 is not sufficient for 99% equilibration to be obtained. The sea-water-brine at 201° F. then enters chamber 2 where its residence time is such that its temperature is reduced to 197° F., that is here again 99% equilibration is not attained, i.e. there is no equilibrium of temperature between the vapour and sea-water-brine stream in the second stage.

The liquid flows through the other flash chambers in each of which, except the last chamber 25, the residence time is such that its temperature does not fall to the saturation temperature of the respective chamber. In the final chamber the residence time is such that the sea-water-brine temperature drops 5° F. to virtually the saturation temperature of that chamber.

For simplification in description no mention is made of the boiling point elevation.

The appropriate residence time in each of the chambers 1 to 24 is short with respect to the residence time in the chambers 1 to 24 in the plant shown in FIG. 1 and this is obtained by reducing the dimensions of the chambers i.e., their volumetric capacity in comparison with the chambers in a plant having the same number of stages and designed to operate with at least 99% equilibration to produce the same stage distillate output. Although the drawings are diagrammatic the relative dimensions of the corresponding chambers in the two plants are diagrammatically indicated.

The reduction of dimensions of the said flash chambers gives the following advantages:

(1) A substantial reduction in the chamber dimensions.
(2) The use of higher sea-water-brine flow rates/unit width and hence the construction of larger capacity MSF plants than those at present known.
(3) A substantial reduction in supporting and reinforcing steelwork.
(4) A substantial reduction in plant foundation preparation, thereby facilitating constructional matters.

The temperatures and percentages of equilibration used are only illustrative of how the process operates.

FIGS. 1 and 2 are also only illustrative. The design percentage of equilibration may be greater or less. The initial unequilibration may commence in the jth stage where j is less than the total number of stages in the plant and is located so that at least two stages follow in which the equilibration is 97% or less. If desirable various ranges of unequilibration may be used in the same plant. The particular choice of parameters is left to the designer.

It is to be understood that in the invention neither the proportion nor the actual quantity of sea-water-brine which is equilibrated is kept absolutely constant from stage to stage but the proportion in all stages where the invention is used is less than or equal to 97% equilibration. The devices which control the passage of the unequilibrated sea-water-brine according to the invention may be of any appropriate form. Thus the flow of the unequilibrated sea-water-brine from stage to stage can be controlled by passing it through flow control devices such as sharp edged orifices 29 of appropriate dimensions and located between the stages.

It will be understood that the size of the heat exchangers must always be such that they will condense the quantities of vapours produced.

What I claim is:

1. A method of distilling a liquid by the flash method in which the liquid is passed through a plurality of flash chambers connected in series which comprises controlling the residence time of the liquid in each of at least two of the flash chambers by the volumetric capacity thereof so that not more than 97% equilibrium as expressed by the formula:

$$\frac{T_{Bi} - T_{Bo}}{T_{Bi} - (t_s + t_e)} (100)$$

where $T_{Bi}$ is the liquid inlet temperature to a stage
$T_{Bo}$ is the liquid outlet temperature from the same stage
$t_s$ is the vapour saturation temperature corresponding to vapour pressure in the stage
$t_e$ is the boiling point elevation if the liquid is a solution is obtained in the volumetrically modified chambers and wherein the percentage of equilibrium in the chamber preceding the first of said modified chambers is marginally less than the percentage of equilibrium in said succeeding modified chambers to initiate the operating percentage of equilibrium in said succeeding chambers thus ensuring an increase in the temperature difference between the liquid and the flashed vapour in said succeeding chambers.

2. A multi-flash distillation plant comprising a series of distillation stages each having a heat exchanger and an associated flash chamber, a heater introduced between the final heat exchanger and the first flash chamber, the heat exchangers and the flash chambers being all connected in series in the order given, the volumetric capacity of at least two of the chambers being such that not more than 97% equilibration as expressed by the formula:

$$\frac{T_{Bi} - T_{Bo}}{T_{Bi} - (t_s + t_e)} (100)$$

where
$T_{Bi}$ is the liquid inlet temperature to a stage
$T_{Bo}$ is the liquid outlet temperature from the same stage
$t_s$ is the vapour saturation temperature corresponding to vapour pressure in the stage
$t_e$ is the boiling point elevation if the liquid is a solution
is obtained in the volumetrically modified chambers and wherein the percentage of equilibration in the chamber preceding the first of said modified chambers is marginally less than the percentage of equilibration in said succeeding modified chambers to initiate the operating percentage of equilibration in said succeeding chambers thus ensuring an increase in the temperature difference between the liquid and the flashed vapour in said succeeding chambers.

References Cited
UNITED STATES PATENTS

| | | | |
|---|---|---|---|
| 3,398,059 | 8/1968 | Cane et al. | 159—2 MS |
| 3,427,227 | 2/1969 | Chamberlin | 202—173 |
| 3,431,179 | 3/1969 | Starmer | 203—11 X |
| 3,533,917 | 10/1970 | Williams | 202—173 |

NORMAN YUDKOFF, Primary Examiner

J. SOFER, Assistant Examiner

U.S. Cl. X.R.

203—11, 88